UNITED STATES PATENT OFFICE.

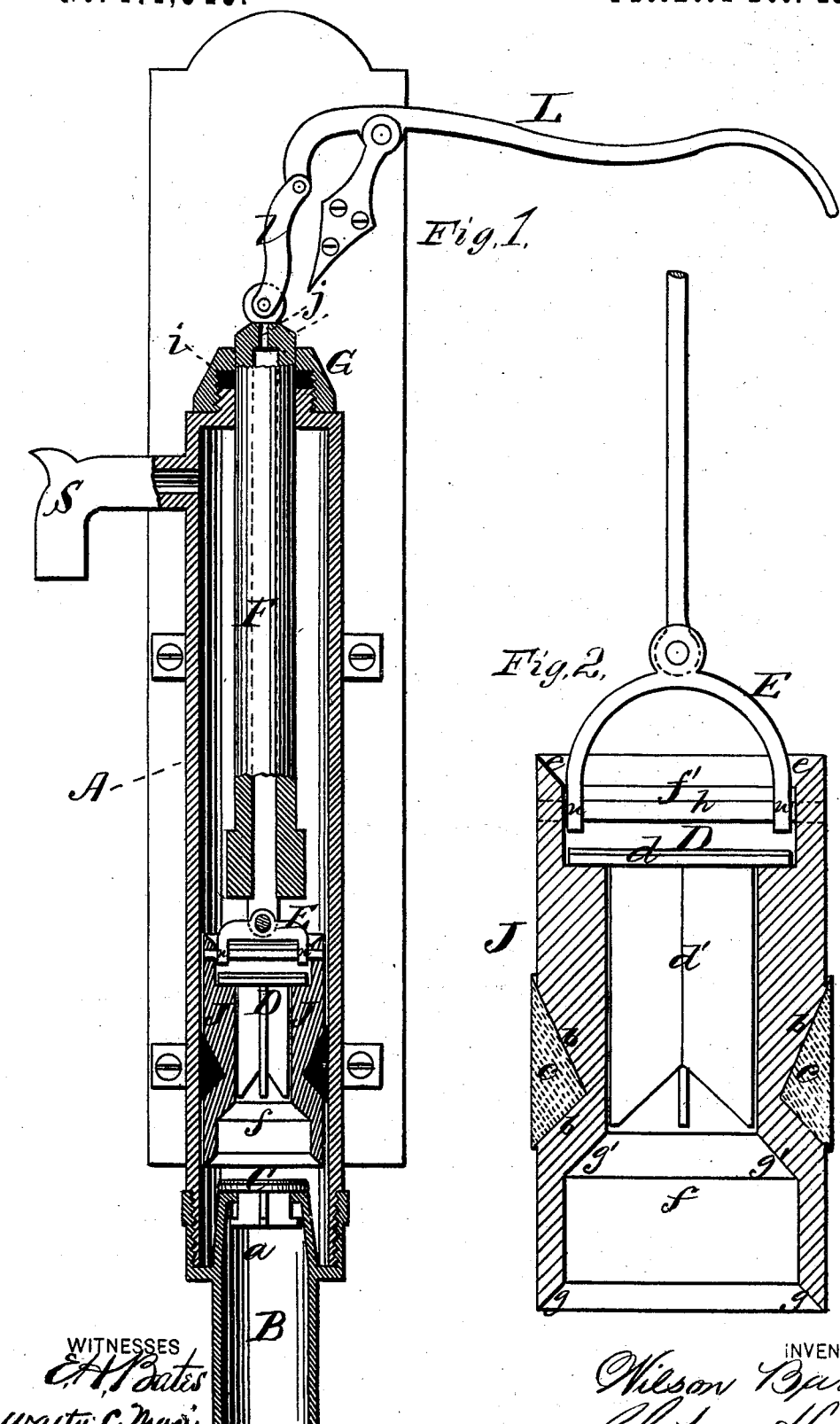

WILSON BARNES, OF MAQUOKETA, IOWA.

IMPROVEMENT IN PUMPS.

Specification forming part of Letters Patent No. 171,545, dated December 28, 1875; application filed September 11, 1875.

*To all whom it may concern:*

Be it known that I, WILSON BARNES, of Maquoketa, in the county of Jackson and State of Iowa, have invented a new and valuable Improvement in Pumps; and I do hereby declare that the following is a full, clear, and exact description of the construction and operation of the same, reference being had to the annexed drawing, making a part of this specification, and to the letters and figures of reference marked thereon.

Figure 1 of the drawings is a representation of a vertical central section of my pump; and Fig. 2 is a sectional detail view thereof.

This invention has relation to improvements in pumps; and its nature consists in the arrangement and novel construction of the various devices used, as will be hereinafter fully explained.

In the annexed drawings, the letter A designates a metallic pump-cylinder having a male screw-threaded lower end, upon which the correspondingly-threaded upper end of a supply-pipe, B, is designed to be applied. Pipe B is provided with a tapering extension, a, projecting into the lower end of the pump-cylinder, upon which a foot-valve, C, is seated.

The monopoly of the peculiar valve I prefer to use in this connection being already secured to me by Letters Patent, no further description thereof is here deemed necessary beyond that conveyed in the statement that it opens upward, and, when on its seat, cuts off communication between the cylinder and its supply-tube B.

J represents a tubular bucket-shaped plunger fitting loosely into the bore of the cylinder, and provided upon its outer surface with an angular annular groove, b, in which is seated a packing-ring, c, made of rubber, leather, or of any other expansible substance. The ring may, however, be, under some circumstances, made of metal.

The double-wedge form of the packing and its recess in the periphery of the plunger enables it to be self-adjusting in the reciprocating movements of the plunger, causing it to be drawn out of its seat somewhat, to form a tight joint with the pump-cylinder in the reciprocating movements of the plunger therein.

D represents a valve, the head $d$ of which is of disk-like form, and is recessed into an annular seat slightly below the upper edge of the plunger, which is chamfered, as shown, $e$, for a purpose hereinafter explained. The stem $d'$ of valve D is of cruciform shape in cross-section, and fits snugly in the body of the bore of the plunger, as shown in Fig. 2, thereby accurately guiding the head $d$ of the valve into the recess of the plunger upon its descent, and securing an air-tight joint for the valve. That portion of the bore of the plunger below the lower edge of the valve-stem is considerably enlarged, as shown in Fig. 2, this enlargement constituting a chamber, $f$, the lower edge of which is chamfered, as shown at $g$, and its upper edge united with the body of the bore by a chamfered surface, $g$. The chamfered upper and lower edges and the intermediate beveled surface $g'$ allow the plunger to reciprocate without undue resistance from the column of water through which it passes. $h$ represents a diametrical rod arranged at the upper part of the plunger, upon which is journaled a strong bail, E, which is in turn pivoted to the lower end of a hollow plunger-rod, F, in such a manner as to form a gimbal or universal joint.

The diameter of rod F is designed to be half that of the pump-cylinder, and its upper end passes through the top of the cylinder, a tight joint being formed therewith by means of a screw-cap, G, and packing-ring $i$.

Rod F is also provided with a vent, $j$, at its upper end, by means of which the flow of water from the spout S is rendered almost continuous, for the reason that as the plunger is caused to reciprocate the water raised thereby will at the first strokes fill up the interior of the plunger-rod, and will, as the plunger descends, flow out therefrom into the pump-cylinder, filling up the hollow of the same, and causing a flow of water from the spout. This discharge will occur, owing to atmospheric pressure, through vent $j$ each time the plunger descends; and will cause water to be uninterruptedly discharged out of the spout, the contents of the tubular rod F being more than sufficient to fulfill this function.

In practice the plunger will be operated by means of a lever, L, and connecting-links l, or in any other suitable manner.

What I claim as new, and desire to secure by Letters Patent, is—

1. In a pump, the hollow plunger-rod F, having vent j, substantially as specified, and for the purpose set forth.

2. The combination of the hollow plunger-rod F, having vent j, with the pump-cylinder A and valved plunger D, substantially as specified.

3. The plunger J, having a vibrating bail, E, and eyes u, whereby a universal-joint connection is obtained between the said plunger and its operating-rod, substantially as specified.

In testimony that I claim the above I have hereunto subscribed my name in the presence of two witnesses.

WILSON BARNES.

Witnesses:
 F. P. MITCHELL,
 THOMAS HENCH.